June 19, 1934.  D. J. CAMPBELL  1,963,400
CENTRIFUGAL CASTING MACHINE
Filed March 7, 1932
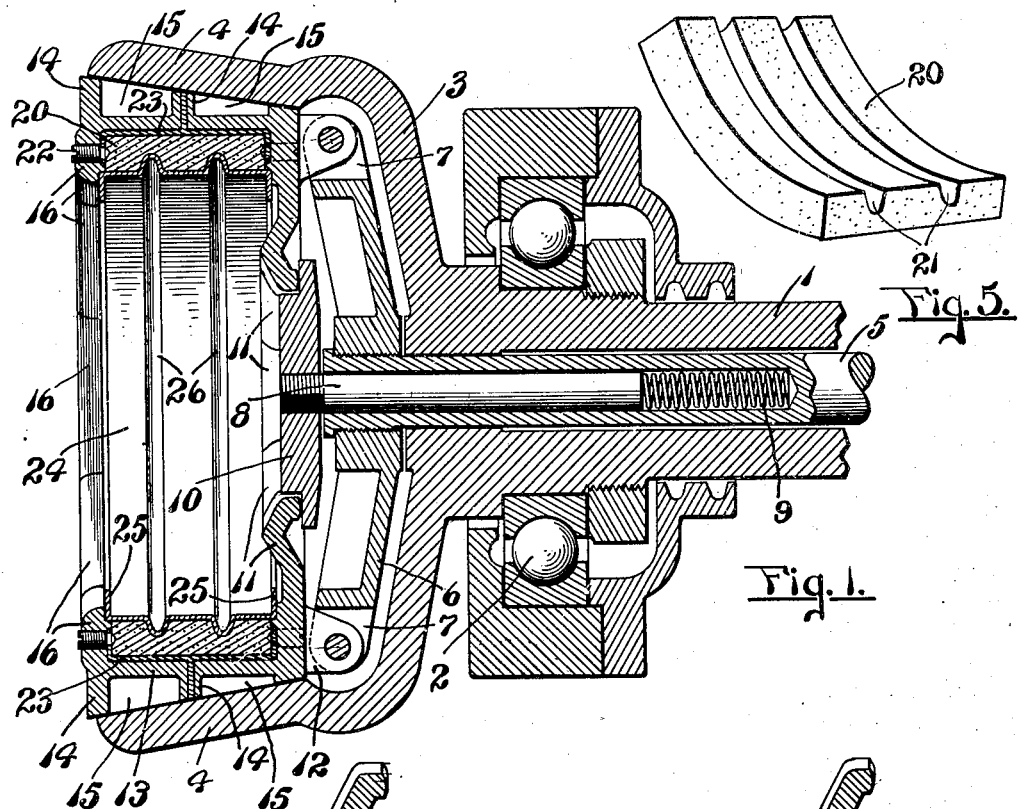
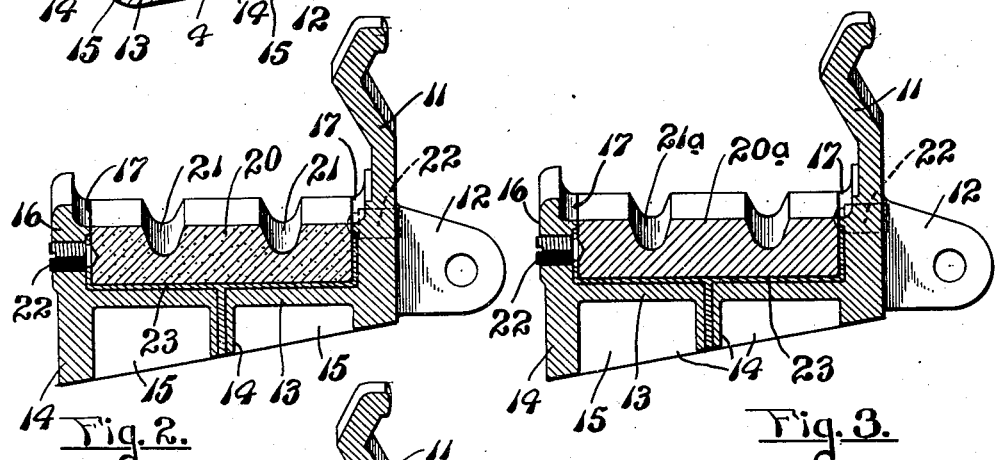
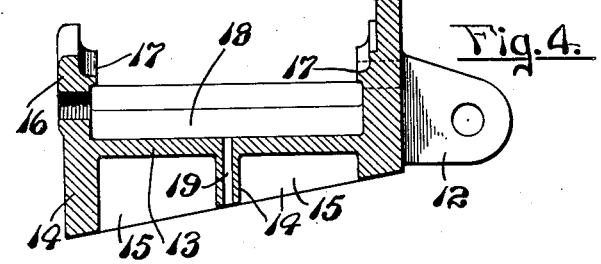
Inventor
Donald J. Campbell
By Liverance and
Van Antwerp
Attorneys Patented June 19, 1934

1,963,400

UNITED STATES PATENT OFFICE 1,963,400

CENTRIFUGAL CASTING MACHINE

Donald J. Campbell, Muskegon Heights, Mich., assignor to Campbell, Wyant & Cannon Foundry Company, Muskegon Heights, Mich., a corporation of Michigan Application March 7, 1932, Serial No. 597,143

8 Claims. (Cl. 22—65)

This invention relates to centrifugal casting machines and is primarily concerned with improvements in holding chucks for maintaining and holding a heated brake drum shell and for rotating the same, during the time of rotation of which melted metal is deposited within the rotating shell. My patent of July 11, 1933, No. 1,917,872, illustrates a machine which I have previously devised for this purpose, and improvements of the present invention are with reference to such type or character of machine as shown in said patent.

A primary object and purpose of the present invention is to provide a supporting means or chuck for a rotating heated shell, whereby the size and shape of the holding members of the chuck will be maintained, and the so-called "growth" and "cracking" of the metal supporting jaws of the chuck is prevented.

In lining cylindrical drum shells with inner cast metal, each shell is ordinarily heated to at least 1200° Fahr. or more, thus heating the shell to a point where the shell is beyond red heat; and the depositing of molten metal at the inner side of the shell at a temperature reaching as high at times as 3000° Fahr., which increases the temperature of the shell above its initial temperature of 1200° Fahr. and maintains this higher for a period of time, and if said shell is in direct contact with jaws of a holding chuck said jaws are affected by the high temperature to which they are exposed, expand, and become burned at their inner sides with a development of surface cracks, scale and growth, and do not contract on cooling to their original dimensions; that is, after the holding chuck has been used for a period of time, the holding chuck jaws have "grown" or enlarged so as not to properly receive and position the particular drum shell, and it is this undesirable result which I have found has occurred that the present invention is desired to obviate, and which I accomplish as hereinafter set forth.

Other objects and purposes will appear from time to time in the following description taken in connection with the accompanying drawing, in which, Fig. 1 is a central vertical section illustrating the application of my invention to a chuck apparatus for holding and rotating heated drum shells.

Fig. 2 is an enlarged section and elevation of one jaw of my improved holding chuck with a refractory insert secured therein.

Fig. 3 is a view similar to Fig. 2 showing the application of an insert of a different composition.

Fig. 4 is a view similar to Fig. 2 with the insert removed.

Fig. 5 is a perspective view of the insert.

Like reference characters refer to like parts in the different figures of the drawing.

Inasmuch of the machine as is required to illustrate the present invention, there is shown a rotatable shaft 1, mounted in a ball bearing 2 and at its outer end having an integral head 3 which terminates in an annular flange 4 conically bored at its inner side.

The shaft 1 is hollow and through it a second shaft 5 passes and extends beyond the outer end of the shaft 1 and carries a head 6 within the head 3, a plurality of ears 7 extending radially from said head 6.

The outer end portion of shaft 5 is axially bored for a distance and a rod 8 inserted partly therein against a coiled compression spring 9. The outer end of the rod 8 carries a disc-like head 10.

Each of the chuck jaws, of which there are a number used, has an inwardly extending finger 11 bearing at its free end against an annular flange on the head 10 and provided at its outer portion with an integral projection 12 pivotally connected to and between a pair of ears 7 on the head 6. From the part 11 a web 13 extends outwardly forming substantially a segment of a cylinder. From the web 13 vanes 14 both transverse and longitudinal of the web are cast defining air pockets 15, complementary to the inner conical surface of the flange 4.

Projecting in an opposite direction from the outer vane 14 from the web 13 and at its outer edge is an annular flange 16 at the inner side of which is an extended rib or arm 17. The part 11 directly opposite is also provided with an extended rib 17. There is thus provided an insert receiving recess 18, in each of the members of the chuck. The vane 14 on the opposite side from the insert recess is provided with a duct or passage 19, the use of which will be hereafter described.

It is designed that within the recess 18 of each chuck jaw an insert 20 is to be located and secured. Preferably, this insert is of a refractory material and may be formed as indicated at 21 to receive ribs on the drum shells when the shell is so formed to be held in the chuck. I have found that carborundum, which is a well known commercial material of high refractory qualities, is a very desirable material from which the inserts 20 may be made, though, of course, the invention is not to be limited to the use of so-called carborundum. "Carborundum" is a trade name for a high refractory manufactured material and where carborundum is mentioned herein, such term is to be construed as meaning any material of a like or similar composition or nature having high refractory properties.

For securing the insert 20 in place screws or dowels 22 are passed through the parts 11 and 16 against the ends of the inserts 20, and also any suitable cement, indicated at 23, may be forced through the duct 19 at the underside and the ends of the inserts until stopped by the ribs 17, the inner sides of the inserts being substantially flush with the low inner sides of said ribs 17, and adjacent surfaces.

The insert used is not necessarily of the nature of carborundum, but, as shown in Fig. 3, an insert 20a may be used, likewise grooved at 21a, the material of the insert being of cast iron, some varieties of which will provide very satisfactory inserts for this purpose. For instance, cast iron, high in combined carbon, is very resistant to the effects of high temperatures, much more so than the ordinary gray iron of which the jaws of the chuck have heretofore been cast, and it does not grow or deteriorate in the same degree or anything like the same degree as does the ordinary gray cast iron.

The insert blocks are either formed to the desired shape previous to attaching them to the chuck jaws or the insert block may be located and secured in place, where they may be dressed at their inner sides, using a suitable diamond tool for the carborundum inserts, or any suitable tool for the cast iron insert blocks, so that the shape will be correct to receive a wrought drum shell 24 formed at its ends with in-turned annular flanges 25, and with annular ribs 26, which seat in the grooves 21. However, the shell may be of any desired form and the insert blocks shaped to correspond thereto.

The ribs 26 and the grooves 21 to receive them are in no sense essential in the present invention as drum shells may be of various shapes, as will best serve the purpose to which they are to be employed.

In placing the drum shell within the chuck jaws, the drawing of the same into the flange 4 of the head 3, and the projection of said holding chuck jaws outwardly to release the drum shell after it has been lined are all fully described in my previous patent, to which reference has been made, and the operation does not here need to be repeated.

With this invention the difficulty previously encountered with regard to the permanent increase in size or "growing" of the chuck jaws which hold the heated drum shells is obviated. And it is, of course, evident that from time to time, as may be necessary, the insert blocks 20 or 20a may be removed and replaced by others. The invention is defined in the appended claims and is to be considered comprehensive of all forms of structure coming within their scope.

I claim:

1. In a centrifugal casting machine, a rotatable chuck having a plurality of movably mounted jaws adapted to be separated or moved toward each other to receive and grip a heated metallic cylindrical shell and rotate the same, and a carborundum holding block secured to the inner side of each jaw to bear against, grip and hold the shell, each of said jaws having a duct leading from its inner side whereby plastic material may be forced therethrough for the purpose described.

2. An article of manufacture comprising, a clutch member consisting of a plurality of detachable holding blocks in combination with a plurality of clutch jaws, said jaws each having ribs abutting the outer portion of the blocks whereby a space is formed between the jaws and the blocks and cement located in the said space.

3. In combination, a series of curved clutch jaws adapted to be moved to an operative position to form a gripping ring, each jaw being of inwardly facing channel configuration, a series of refractory blocks located in said channel and means for detachably holding said blocks in place.

4. In a centrifugal casting machine, a chuck for holding and rotating a heated preformed metallic shell and comprising a plurality of jaws, a facing of refractory material at the inner side of each jaw, each jaw at the outer side being formed to provide air insulation pockets.

5. In a centrifugal casting machine, a chuck for holding and rotating a preformed shell, said chuck comprising a plurality of clamping members to engage the shell, a carborundum engaging facing detachably secured to the inner face of each jaw, each of said jaws at its outer side being provided with a plurality of air pockets.

6. In a centrifugal casting machine, a chuck member having a plurality of gripping jaws, holding blocks at the inner side of each jaw, and detachable means for connecting each block to each jaw whereby replacement of the several blocks may be as desired.

7. In a centrifugal casting machine, a chuck for holding and rotating brake drum shells comprising a plurality of contractible and extensible shell clamping members, the said clamping members each being provided with a recess and a carborundum member in each of the said recesses.

8. A centrifugal casting machine as set forth in claim 6 in which the said detachable means also positions the blocks in predetermined positions.

DONALD J. CAMPBELL.